United States Patent
Wang et al.

(10) Patent No.: US 11,882,030 B1
(45) Date of Patent: Jan. 23, 2024

(54) NETWORK PACKET TRANSMISSION DEVICE AND NETWORK PACKET TRANSMISSION METHOD THEREOF

(71) Applicant: REALTEK SEMICONDUCTOR CORPORATION, Hsinchu (TW)

(72) Inventors: Mei Yue Wang, Suzhou (CN); Juan Liu, Suzhou (CN); Hang Chi, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/167,498

(22) Filed: Feb. 10, 2023

(30) Foreign Application Priority Data

Sep. 14, 2022 (CN) .......................... 202211115332.5

(51) Int. Cl.
*H04L 45/00* (2022.01)
*H04L 12/46* (2006.01)
*H04L 45/121* (2022.01)

(52) U.S. Cl.
CPC ............ *H04L 45/566* (2013.01); *H04L 12/46* (2013.01); *H04L 12/4641* (2013.01); *H04L 45/121* (2013.01)

(58) Field of Classification Search
None
See application file for complete search history.

(56) References Cited

U.S. PATENT DOCUMENTS

| 7,292,577 | B1 * | 11/2007 | Ginipalli | H04L 45/306 |
| | | | | 370/392 |
| 8,824,485 | B2 * | 9/2014 | Biswas | H04L 12/4641 |
| | | | | 370/530 |
| 10,880,208 | B1 * | 12/2020 | Chandra | H04L 45/16 |
| 11,509,428 | B2 * | 11/2022 | Tu | H04L 1/1845 |
| 2002/0191628 | A1 * | 12/2002 | Liu | H04L 12/4641 |
| | | | | 370/428 |
| 2004/0028058 | A1 * | 2/2004 | Katoh | H04L 12/1886 |
| | | | | 370/395.54 |
| 2012/0224494 | A1 * | 9/2012 | Kataoka | H04L 49/557 |
| | | | | 370/244 |

(Continued)

FOREIGN PATENT DOCUMENTS

| CN | 100372321 C | 2/2008 |
| CN | 107566267 A | 1/2018 |

OTHER PUBLICATIONS

English translation of CN100372321C.
English translation of CN107566267A.

*Primary Examiner* — Lashonda Jacobs-Burton
(74) *Attorney, Agent, or Firm* — WPAT, P.C.; Anthony King

(57) ABSTRACT

The present disclosure provides a network packet transmission device and a network packet transmission method thereof. The network packet transmission method includes: receiving a network packet, wherein the network packet has at least one packet attribute; determining at least one destination VID for the network packet according to the at least one packet attribute; determining a transmission speed corresponding to the at least one destination VID based on at least one LAN speed table; and transmitting the network packet to a VLAN corresponding to the at least one destination VID according to the transmission speed.

20 Claims, 12 Drawing Sheets

(56) References Cited

U.S. PATENT DOCUMENTS

| | | | |
|---|---|---|---|
| 2013/0208718 A1* | 8/2013 | Ashwood-Smith | H04L 45/20 370/389 |
| 2018/0159729 A1* | 6/2018 | Deshmukh | H04L 41/0895 |
| 2018/0375821 A1* | 12/2018 | Yang | H04L 61/5007 |
| 2023/0250017 A1* | 8/2023 | Ye | C03C 25/40 65/448 |

* cited by examiner

NETWORK PACKET TRANSMISSION DEVICE AND NETWORK PACKET TRANSMISSION METHOD THEREOF

CROSS REFERENCE TO RELATED APPLICATIONS

This application claims priority of China application No. 202211115332.5 filed on Sep. 14, 2022, which is incorporated by reference in its entirety.

BACKGROUND

Field of the Invention

The present invention relates generally to network packet transmission device and network packet transmission method thereof, in particular, to network packet transmission device and network packet transmission method thereof under virtual local network.

Description of Related Art

With to the advancement of network technology, various network applications have been developed. With the increase of various network application services, the burden of network loading has become more and more heavy; however, the network resources available to users are limited. Therefore, one goal in the related field is to make continuous efforts to prioritize the network services according to the urgency and importance of the network applications and to achieve the differentiated network services, so as to ensure the quality of important network applications and enhance the user experience.

BRIEF SUMMARY OF THE INVENTION

Some embodiments of the present invention provide a network packet transmission method. The network packet transmission method includes: receiving a network packet, wherein the network packet has at least one packet attribute; determining at least one destination virtual local area network identification (VID) of the network packet according to the at least one packet attribute; determining a transmission speed corresponding to the at least one destination VID based on at least one local area network speed table; and transmitting the network packet to a virtual local area network (VLAN) corresponding to the at least one destination VID according to the transmission speed.

Some embodiments of the present invention provide a network packet transmission device. The network packet transmission device includes: a transceiver, a memory and a processor. The memory is configured to store at least one local area network speed table. The processor is electrically connected to the transceiver and the memory and configured to: receive a network packet via transceiver, wherein the network packet has at least one packet attribute; determine at least one destination VID of the network packet according to the at least one packet attribute; determine a transmission speed corresponding to the at least one destination VID based on at least one local area network speed table; and transmit the network packet to a VLAN corresponding to the at least one destination VID via transceiver according to the transmission speed.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Embodiments of the present invention are discussed in detail below. It should be appreciated, however, that the present invention provides many applicable inventive concepts that can be embodied in a wide variety of specific contexts. The specific embodiments discussed are merely illustrative and do not limit the scope of the disclosure.

Figure 1A:
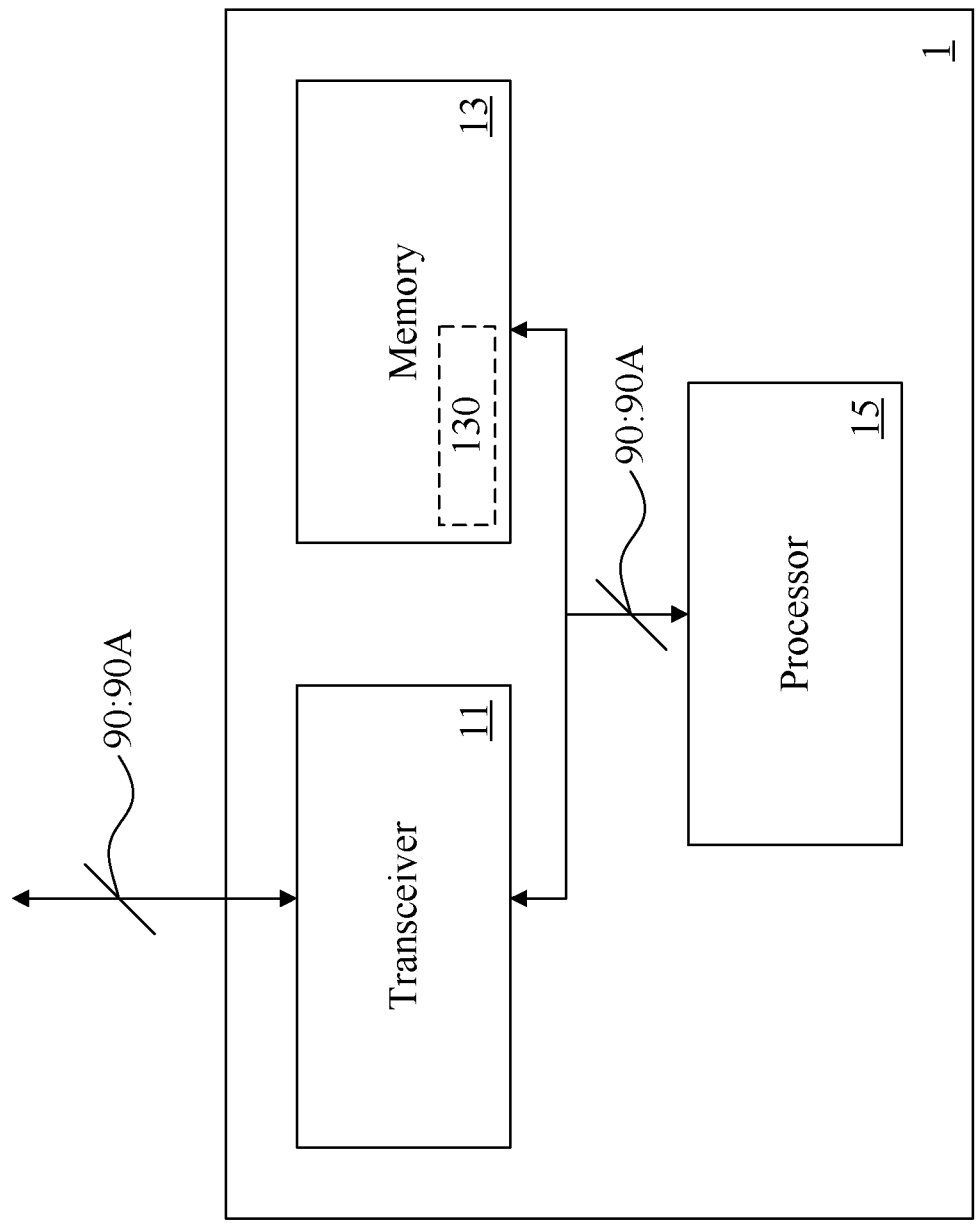
FIG. 1A is a block diagram illustrating a network packet transmission device according to some embodiments of the present disclosure.

Reference is made to FIG. 1A, which is a block diagram illustrating a network packet transmission device 1 according to some embodiments of the present disclosure. In some embodiments, the network packet transmission device 1 includes: a transceiver 11, a memory 13 and a processors 15. The memory 13 stores a local area network table 130, wherein the local area network table 130 records a correspondence between the virtual local area network identification (VID) and the network speed. The processors 15 and the transceiver 11 is electrically connected to the memory 13. The related packet transmission operations are further discussed below.

Figure 1B:
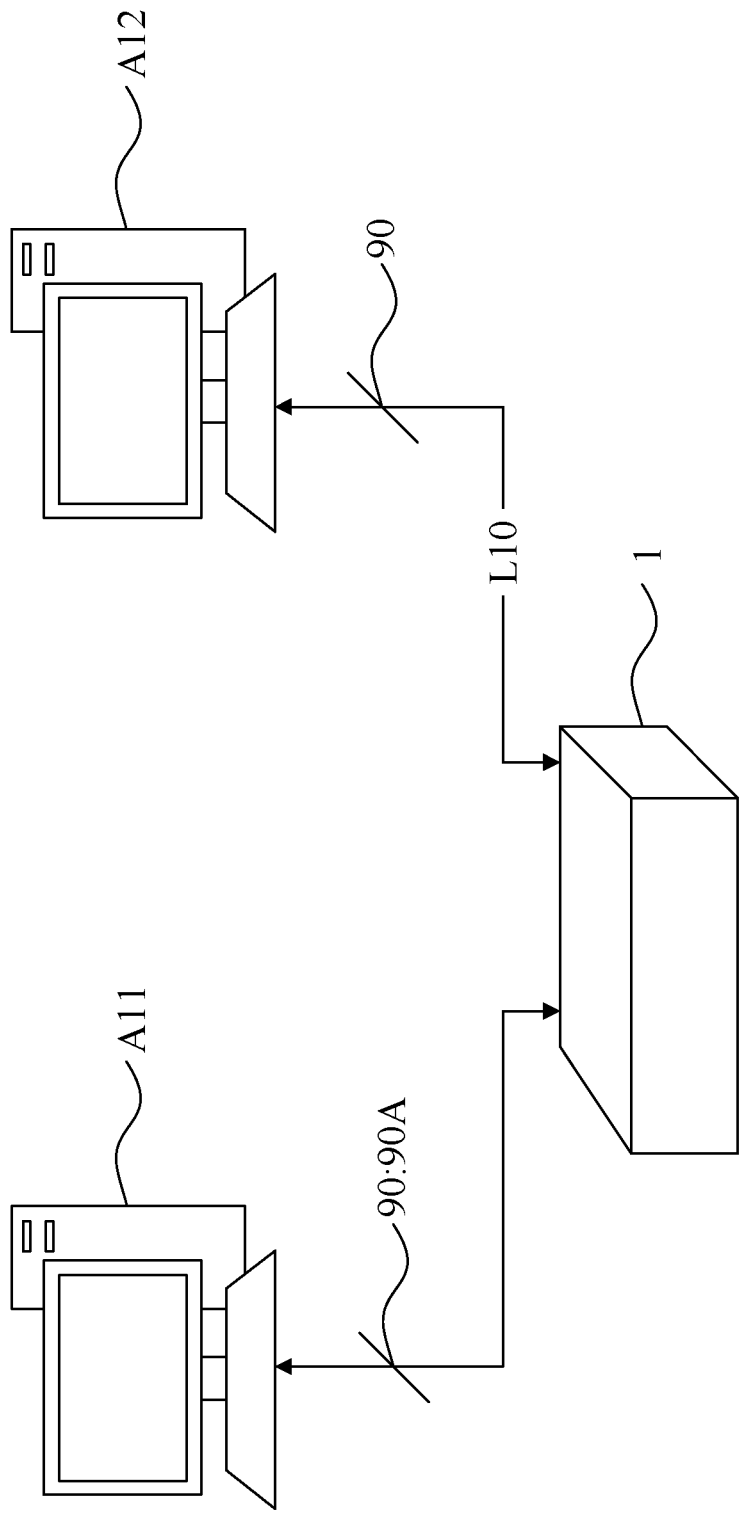
FIG. 1B is a schematic diagram illustrating a network framework according to some embodiments of the present disclosure.
Figure 1C:
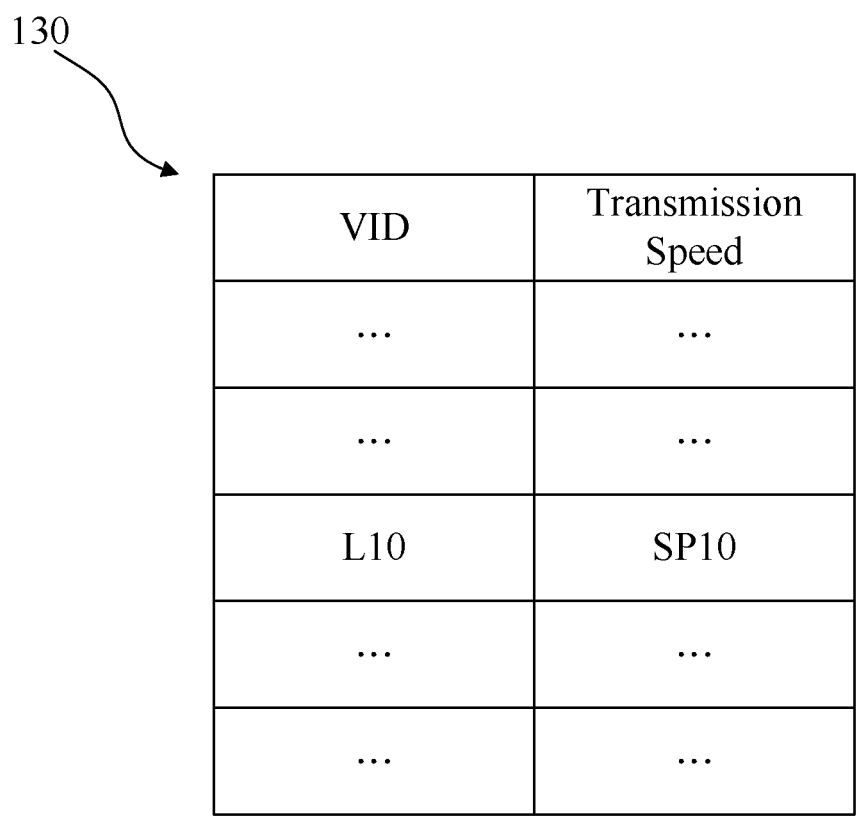
FIG. 1C is a schematic diagram illustrating the local area network table according to some embodiments of the present disclosure.

Reference is made to both FIG. 1B and FIG. 1C. FIG. 1B is a schematic diagram illustrating a network framework according to some embodiments of the present disclosure, and FIG. 1C is a schematic diagram illustrating the local area network table 130 according to some embodiments of the present disclosure. Specifically, the processors 15 receives a network packet 90 via the transceiver 11 from a virtual local area network (VLAN) A11. In this case, the network packet 90 has at least one packet attribute 90A. The processors 15 determines at least one destination VID of the network packet 90 according to at least one packet attribute 90A.

In these embodiments, at least one destination VID includes a first destination VID L10. After determining first destination VID L10 of the network packet 90, the processors 15 determines a transmission speed SP10 corresponding to the first destination VID L10 based on the local area network speed table 130. Next, the processors 15 transmits the network packet 90 to a VLAN A12 corresponding to the first destination VID L10 via the transceiver 11 according to the transmission speed SP10. For example, the transmission speed SP10 is 50 Mbps, and the speed that the processors 15 transmits the network packet 90 to the VLAN A12 via the transceiver 11 is limited to 50 Mbps at most.

Figure 2A:
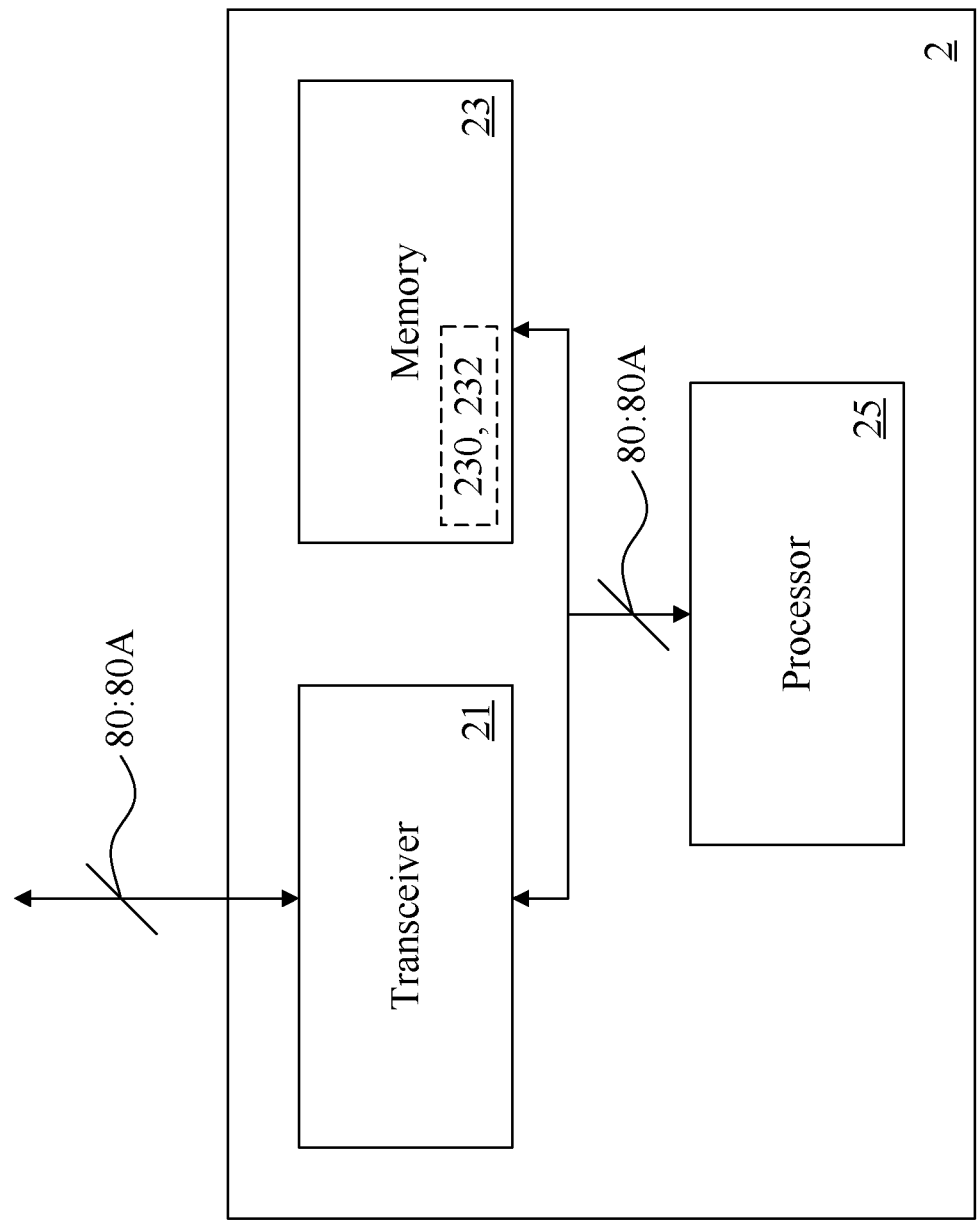
FIG. 2A is a block diagram illustrating a network packet transmission device according to some embodiments of the present disclosure.

Reference is made to FIG. 2A, which is a block diagram illustrating a network packet transmission device 2 according to some embodiments of the present disclosure. In some embodiments, the network packet transmission device 2 includes: a transceiver 21, a memory 23 and a processors 25. The memory 23 stores a local area network table 230 and a transmission speed correspondence table 232, wherein the local area network table 230 records a correspondence between the VID and the speed index value, and the transmission speed correspondence table 232 records a correspondence between the speed index value and the transmission speed. The processors 25 is electrically connected to the transceiver 21 and the memory 23. The related packet transmission operations are further discussed below.

Figure 2B:
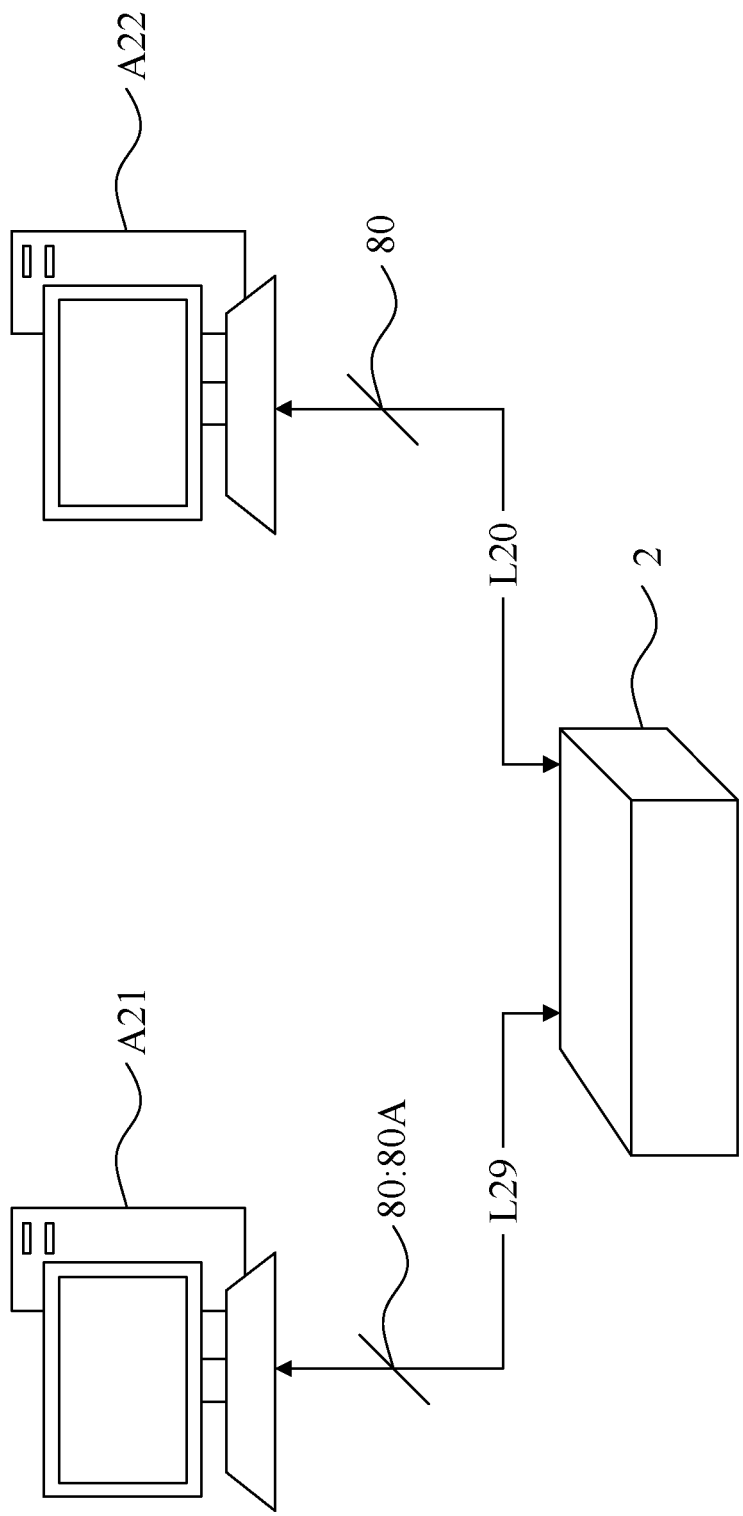
FIG. 2B is a schematic diagram illustrating a network framework according to some embodiments of the present disclosure.
Figure 2C:
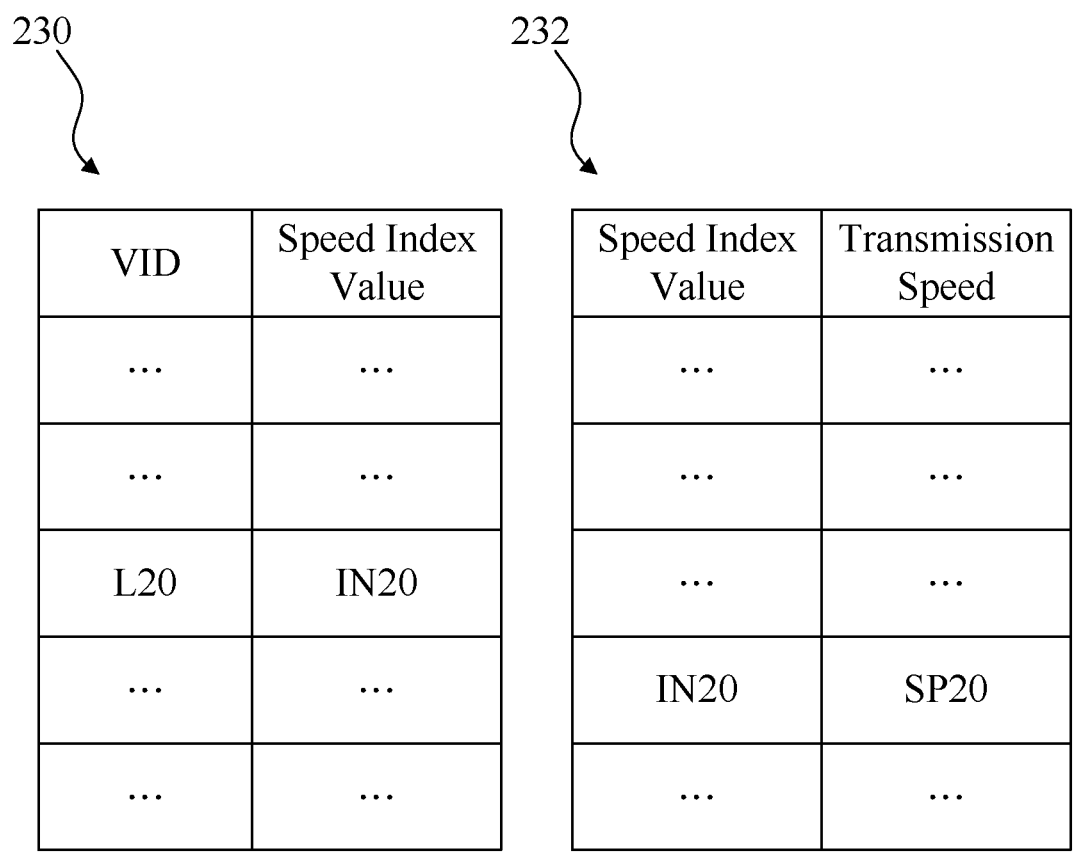
FIG. 2C is a schematic diagram illustrating the local area network table according to some embodiments of the present disclosure.

Reference is made to both FIG. 2B and FIG. 2C. FIG. 2B is a schematic diagram illustrating a network framework according to some embodiments of the present disclosure, and FIG. 2C is a schematic diagram illustrating the local area network table 230 and the transmission speed correspondence table 232 according to some embodiments of the present disclosure. Specifically, the processors 25 receives a network packet 80 via the transceiver 21 from a VLAN A21. In this case, the network packet 80 has at least one packet attribute 80A.

In some embodiments, the at least one packet attribute 80A includes a source VID and a priority of the source VID. For example, when VID of the VLAN A21 is L29, the source VID is L29, and the information service of the VLAN A21 has a high priority. In this way, the processors 25 determines at least one destination VID of the network packet 80 according to at least one packet attribute 80A.

In these embodiments, at least one destination VID includes a first destination VID L20. After determining the first destination VID L20 of the network packet 80, the processors 25 determines a speed index value IN20 corresponding to the first destination VID L20 based on the local area network speed table 230. Next, the processors 25 determines a transmission speed SP20 corresponding to the speed index value IN20 based on the transmission speed table 232. In this way, the processors 25 transmits the network packet 80 to a VLAN A22 corresponding to the first destination VID L20 via the transceiver 21 according to the transmission speed SP20. For example, the transmission speed SP20 is 100 Mbps, and the speed that the processors 25 transmits the network packet 80 to the VLAN A22 via the transceiver 21 is limited to 100 Mbps at most.

Figure 3A:
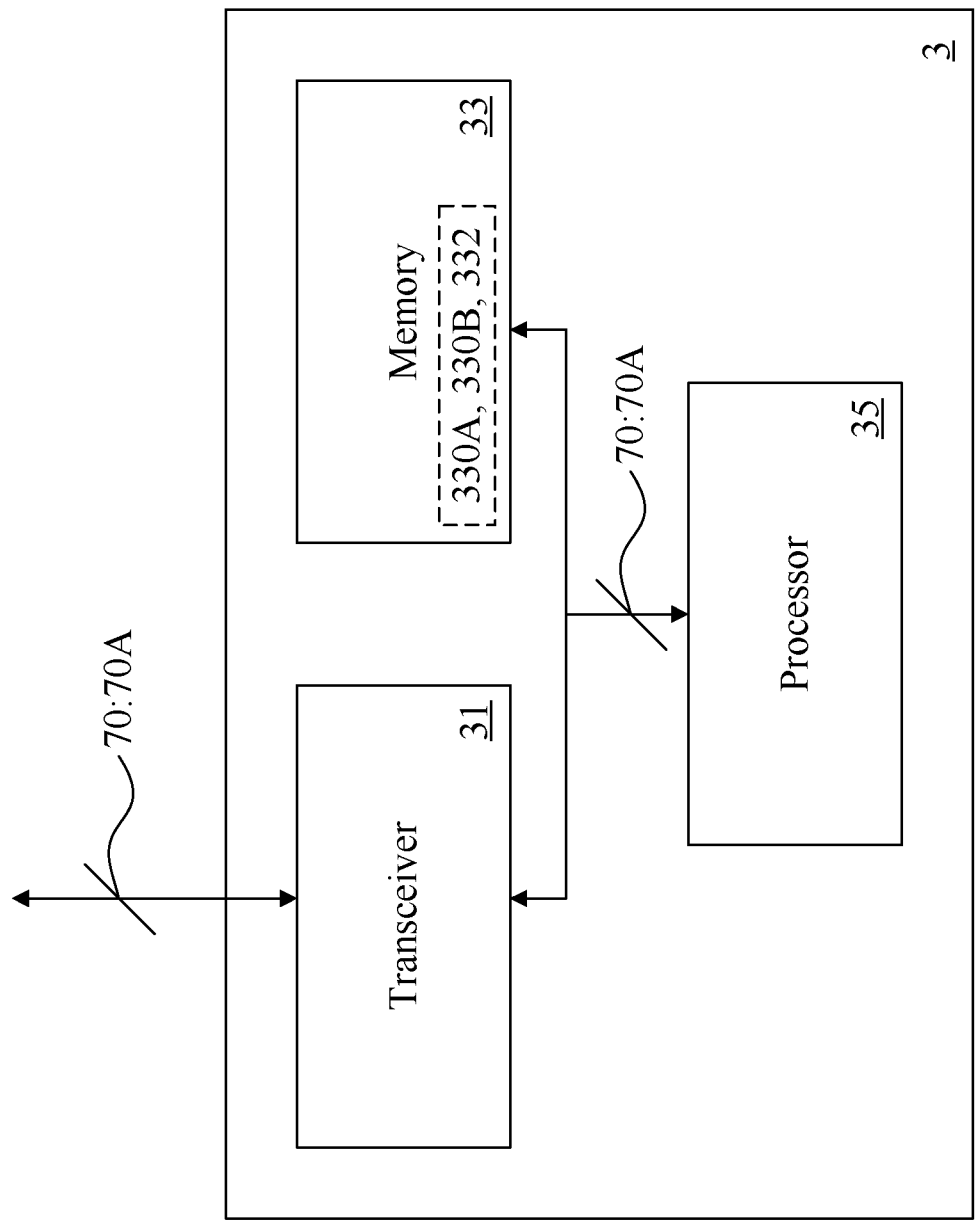
FIG. 3A is a block diagram illustrating a network packet transmission device according to some embodiments of the present disclosure.

Reference is made to FIG. 3A, which is a block diagram illustrating a network packet transmission device 3 according to some embodiments of the present disclosure. In some embodiments, the network packet transmission device 3 includes: a transceiver 31, a memory 33 and a processors 35. The memory 33 stores local area network tables 330A, 330B and a transmission speed correspondence table 332.

The local area network tables 330A, 330B respectively records a correspondence between the VID, the speed index value and valid status field, and the transmission speed correspondence table 332 records a correspondence between the speed index value and the transmission speed. The processors 35 is electrically connected to the transceiver 31 and the memory 33. The related packet transmission operations are further discussed below.

Figure 3B:
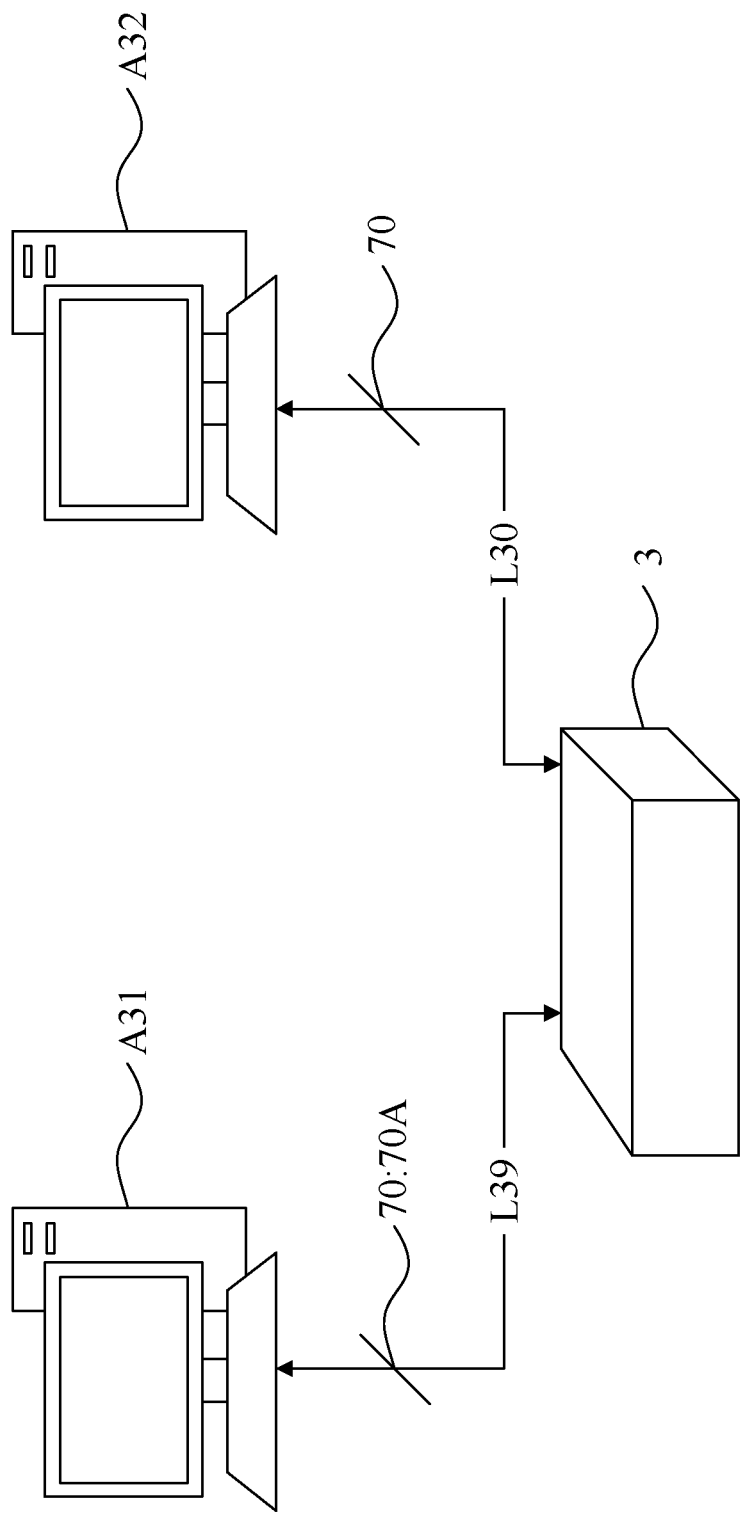
FIG. 3B is a schematic diagram illustrating a network framework according to some embodiments of the present disclosure.
Figure 3C:
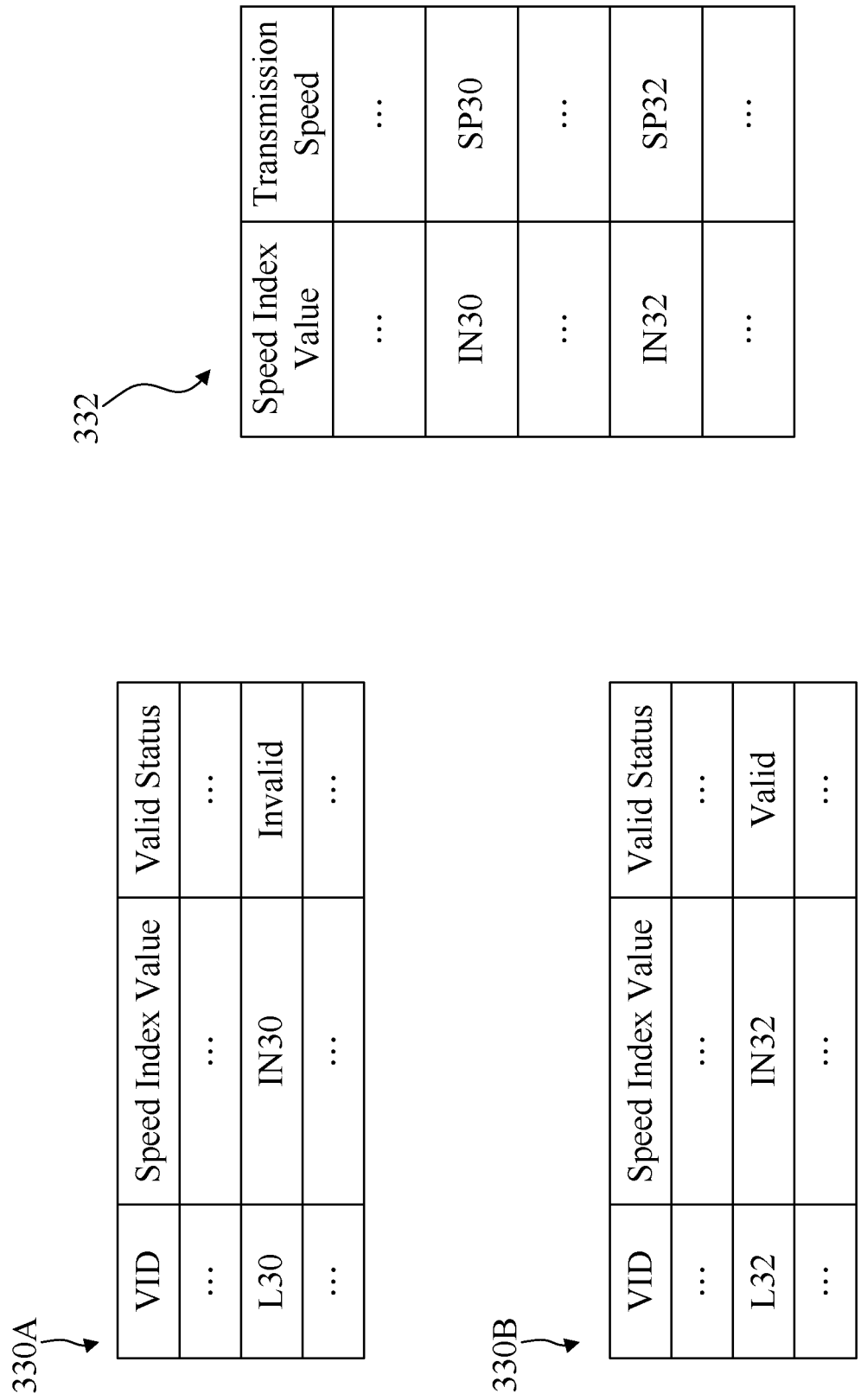
FIG. 3C is a schematic diagram illustrating the local area network tables according to some embodiments of the present disclosure.

Reference is made to both FIG. 3B and FIG. 3C. FIG. 3B is a schematic diagram illustrating a network framework according to some embodiments of the present disclosure, and FIG. 3C is a schematic diagram illustrating the local area network tables 330A, 330B and the transmission speed correspondence table 332 according to some embodiments of the present disclosure. Specifically, the processors 35 receives a network packet 70 via the transceiver 31 from a VLAN A31. In this case, the network packet 70 has at least one packet attribute 70A.

In some embodiments, the at least one packet attribute 70A includes a source VID and a priority of the source VID. For example, when VID of the VLAN A31 is L39, the source VID is L39, and the information service of the VLAN A31 has a high priority. In this way, the processors 35 determines at least one destination VID of the network packet 70 according to at least one packet attribute 70A.

In these embodiments, the network packet transmission device 3 supports QinQ network, and said at least one destination VID includes a first destination VID L30 (such as S-VID in QinQ network) and a second destination VID L32 (such as C-VID in QinQ network). After determining the first destination VID L30 and the second destination VID L32 of the network packet 70, the processors 25 determines a speed index value IN30 corresponding to the first destination VID L30 and a speed index value IN32 corresponding to the second destination VID L32 based on the local area network speed table 330A, 330B, respectively.

In these embodiments, the validity field of the speed index value IN30 corresponding to the first destination VID L30 is "invalid," and the validity field of the speed index value IN32 corresponding to the second destination VID L32 is "valid." In this way, the processors 35 determines the transmission speed using the speed index value IN32 corresponding to the second destination VID L32. Next, the processors 35 determines a transmission speed SP32 corresponding to the speed index value IN32 based on the transmission speed table 332. In this way, the processors 35 transmits the network packet 70 to a VLAN A32 corresponding to the second destination VID L32 via the transceiver 31 according to the transmission speed SP32. For example, the transmission speed SP32 is 150 Mbps, and the speed that the processors 35 transmits the network packet 70 to the VLAN A32 via the transceiver 31 is limited to 150 Mbps at most.

Figure 4:
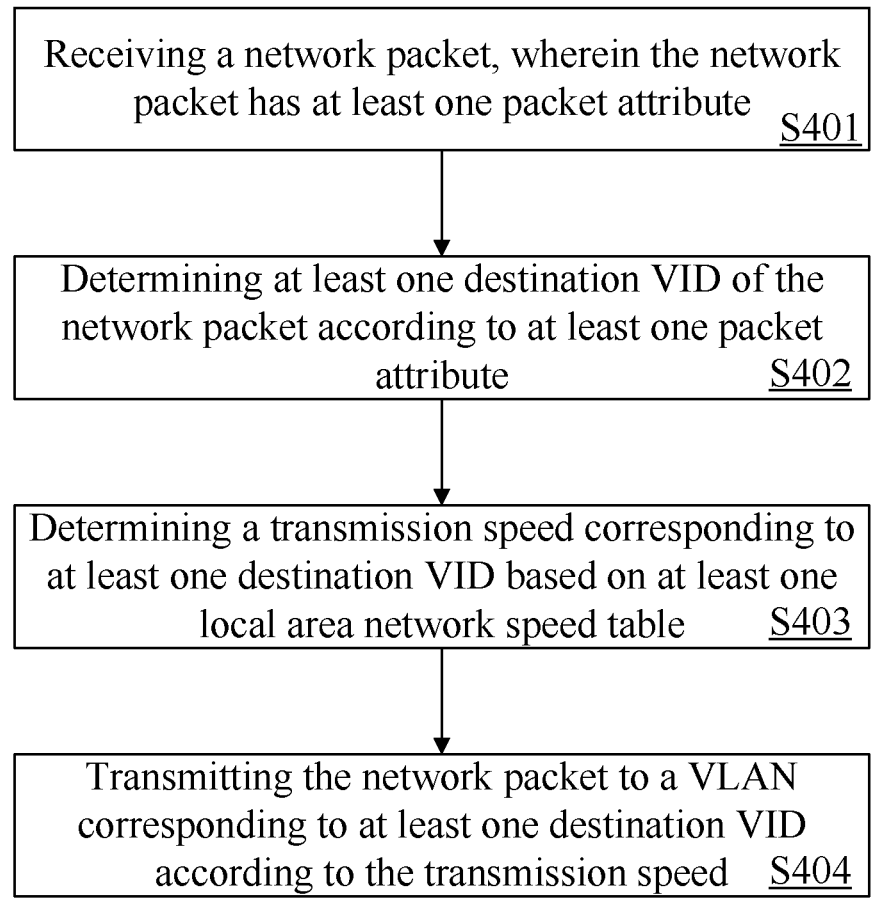
FIG. 4 is a flowchart of a network packet transmission method according to some embodiments of the present disclosure.

Some embodiments of the present disclosure include a network packet transmission method, which is shown in the flowchart of FIG. 4. The network packet transmission method of these embodiments is implemented using a network packet transmission device (such as the network packet transmission device according to the above embodiments), and the detailed operations of the method are as follows. First, step S401 is execute to receive a network packet. In this case, the network packet has at least one packet attribute. Step S402 is execute to determine at least one destination VID of the network packet according to at least one packet attribute. Step S403 is execute to determine a transmission speed corresponding to at least one destination VID based on at least one local area network speed table. Step S404 is execute to transmit the network packet to a VLAN corresponding to at least one destination VID according to the transmission speed.

Figure 5:
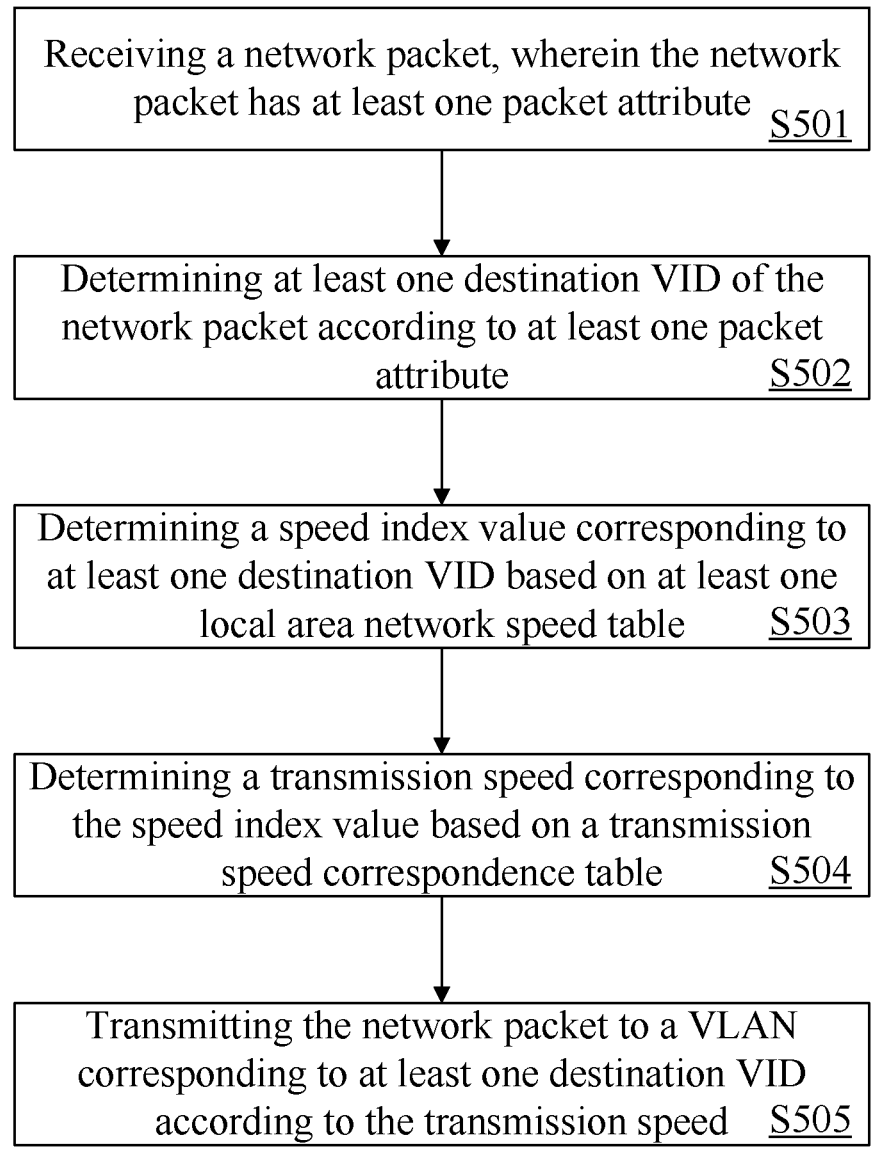
FIG. 5 is a flowchart of a network packet transmission method according to some embodiments of the present disclosure.

Some embodiments of the present disclosure include a network packet transmission method, which is shown in the flowchart of FIG. 5. The network packet transmission method of these embodiments is implemented using a network packet transmission device (such as the network packet transmission device according to the above embodiments), and the detailed operations of the method are as follows. First, step S501 is execute to receive a network packet. The network packet has at least one packet attribute. In these embodiments, said at least one packet attribute includes the source VID, a priority of the source VID or a combination of the foregoing.

Step S502 is execute to determine at least one destination VID of the network packet according to at least one packet attribute. Step S503 is execute to a speed index value corresponding to at least one destination VID based on at least one local area network speed table. Step S504 is execute to determine a transmission speed corresponding to the speed index value based on a transmission speed correspondence table. Step S505 is execute to transmit the network packet to a VLAN corresponding to at least one destination VID according to the transmission speed.

Figure 6:
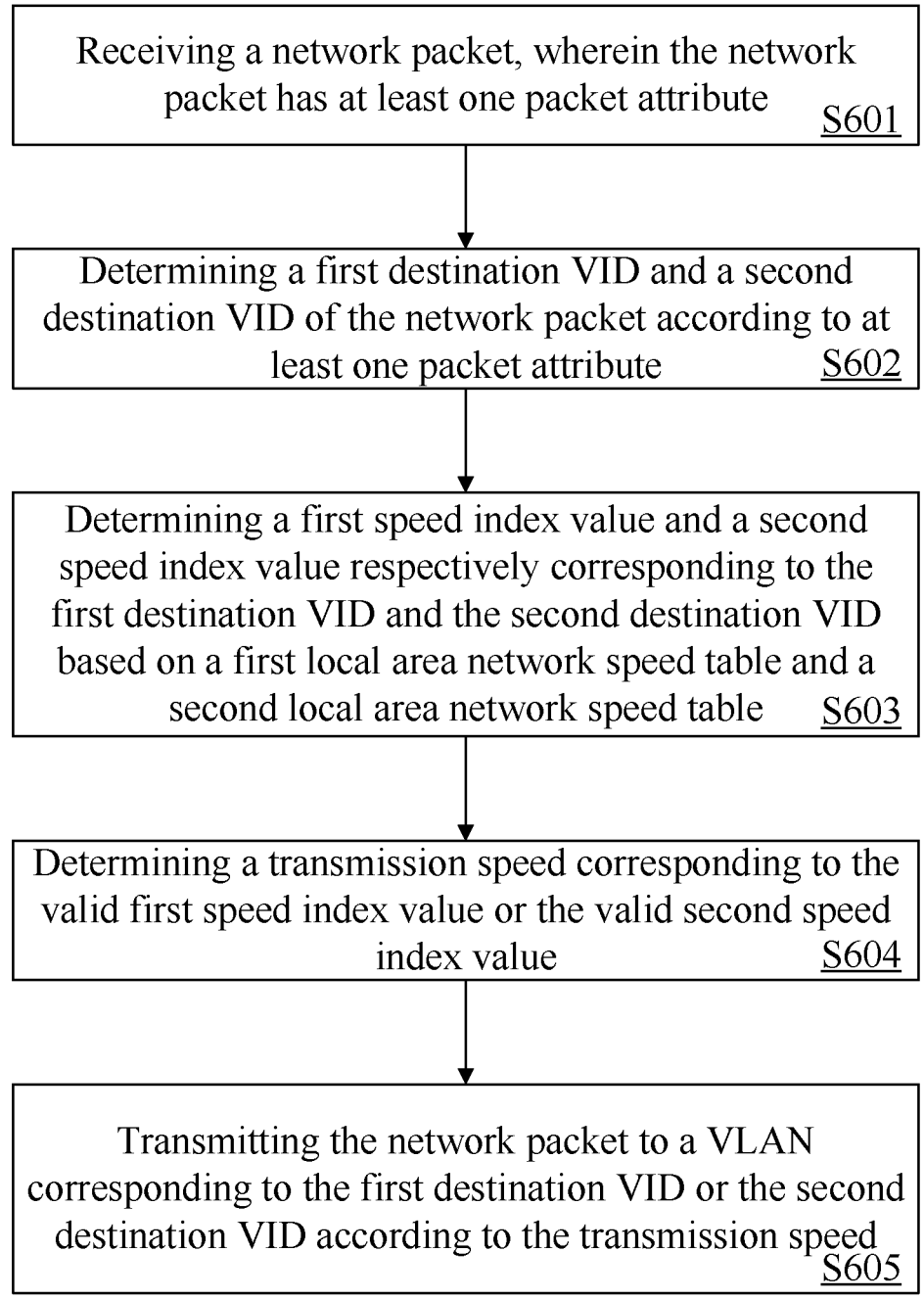
FIG. 6 is a flowchart of a network packet transmission method according to some embodiments of the present disclosure.

Some embodiments of the present disclosure include a network packet transmission method, which is shown in the flowchart of FIG. 6. The network packet transmission method of these embodiments is implemented using a network packet transmission device (such as the network packet transmission device according to the above embodiments), and the detailed operations of the method are as follows. First, step S601 is executed to receive a network packet. The network packet has at least one packet attribute. In these embodiments, said at least one packet attribute includes the source VID, a priority of the source VID or a combination of the foregoing.

Step S602 is execute to determine a first destination VID and a second destination VID of the network packet according to at least one packet attribute. Step S603 is execute to determine a first speed index value and a second speed index value respectively corresponding to the first destination VID and the second destination VID based on a first local area network speed table and a second local area network speed table. Step S604 is execute to determine a transmission speed corresponding to the valid first speed index value or the valid second speed index value. Step S605 is execute to transmit the network packet to a VLAN corresponding to the first destination VID or the second destination VID according to the transmission speed.

In summary, the present invention provides a network packet transmission device and a network packet transmission method to achieve differentiated network services using VID and the corresponding local area network speed table under the architecture of virtual local area network, thus ensuring the quality of important network application services and enhancing the user experience.

While this invention has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the invention by simply employing the elements of the independent claims. Accordingly, embodiments of the invention as set forth herein are intended to be illustrative, not limiting. Various changes may be made without departing from the spirit and scope of the invention.

What is claimed is:

1. A network packet transmission method, comprising:
   receiving a network packet, wherein the network packet has at least one packet attribute;
   determining at least one destination virtual local area network identification (VID) of the network packet according to the at least one packet attribute;
   determining a transmission speed corresponding to the at least one destination VID based on at least one local area network speed table; and
   transmitting the network packet to a virtual local area network (VLAN) corresponding to the at least one destination VID according to the transmission speed.

2. The network packet transmission method of claim 1, wherein the at least one packet attribute comprises a source VID.

3. The network packet transmission method of claim 2, wherein the at least one packet attribute comprises a priority of the source VID.

4. The network packet transmission method of claim 1, wherein the step of determining a transmission speed corresponding to the at least one destination VID based on at least one local area network speed tables further comprises:
   determining a speed index value corresponding to the at least one destination VID based on the at least one local area network speed table; and
   determining the transmission speed corresponding to the speed index value.

5. The network packet transmission method of claim 4, wherein the step of determining the transmission speed corresponding to the speed index value further comprises:
   determining the transmission speed corresponding to the speed index value based on a transmission speed correspondence table.

6. The network packet transmission method of claim 1, wherein the at least one destination VID comprises a first destination VID and a second destination VID.

7. The network packet transmission method of claim 6, wherein the at least one local area network speed table comprises a first local area network speed table and a second local area network speed table.

8. The network packet transmission method of claim 7, wherein the step of, determining the transmission speed corresponding to the at least one destination VID based on the at least one local area network speed table further comprises:
   determining a first speed index value and a second speed index value corresponding to the first destination VID and the second destination VID, respectively, based on the first local area network speed table and the second local area network speed table, wherein at least one of the first speed index value and the second speed index value is valid; and
   determining the transmission speed corresponding to the valid first speed index value or the valid second speed index value.

9. The network packet transmission method of claim 8, wherein the first speed index value and the second speed index value correspond to a first valid status field and a second valid status field, respectively.

10. The network packet transmission method of claim 7, wherein the step of determining the transmission speed corresponding to the valid first speed index value or the valid second speed index value further comprises:
   determining the transmission speed corresponding to the valid first speed index value or the valid second speed index value based on a transmission speed correspondence table.

11. A network packet transmission device, comprising:
   a transceiver;
   a memory, configured to store at least one local area network speed table; and
   a processors, electrically connected to the transceiver and the memory and configured to:
      receive a network packet via transceiver, wherein the network packet has at least one packet attribute;
      determine at least one destination virtual local area network identification (VID) of the network packet according to the at least one packet attribute;
      determine a transmission speed corresponding to the at least one destination VID based on at least one local area network speed table; and
      transmit the network packet to a virtual local area network (VLAN) corresponding to the at least one destination VID via transceiver according to the transmission speed.

12. The network transmission device of claim 11, wherein the at least one packet attribute comprises a source VID.

13. The network transmission device of claim 12, wherein the at least one packet attribute comprises a priority of the source VID.

14. The network transmission device of claim 11, wherein the processors is further configured to:
   determining a speed index value corresponding to the at least one destination VID based on the at least one local area network speed table; and
   determining the transmission speed corresponding to the speed index value.

15. The network transmission device of claim 14, wherein the processors is further configured to:
   determining the transmission speed corresponding to the speed index value based on a transmission speed correspondence table.

16. The network transmission device of claim 11, wherein the at least one destination VID comprises a first destination VID and a second destination VID.

17. The network transmission device of claim 16, wherein the at least one local area network speed table comprises a first local area network speed table and a second local area network speed table.

18. The network transmission device of claim 17, wherein the processors is further configured to:
   determining a first speed index value and a second speed index value corresponding to the first destination VID and the second destination VID, respectively, based on the first local area network speed table and the second local area network speed table, wherein at least one of the first speed index value and the second speed index value is valid; and
   determining the transmission speed corresponding to the valid first speed index value or the valid second speed index value.

19. The network transmission device of claim 18, wherein the first speed index value and the second speed index value correspond to a first valid status field and a second valid status field, respectively.

20. The network transmission device of claim 17, wherein the processors is further configured to:
   determining the transmission speed corresponding to the valid first speed index value or the valid second speed index value based on a transmission speed correspondence table.

* * * * *